July 5, 1927.

W. H. SIDDALL

EYEGLASS CONSTRUCTION

Filed Nov. 18, 1926

1,635,142

INVENTOR
Wilbur H. Siddall
BY
Robert S. Blair  ATTORNEY

Patented July 5, 1927.

1,635,142

UNITED STATES PATENT OFFICE.

WILBUR H. SIDDALL, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed November 18, 1926. Serial No. 149,061.

This invention relates to eyeglass construction and more particularly to the construction of eyeglass frames of what is known as the Oxford type and made of non-metallic material.

One of the objects of the invention is to provide a construction of the above nature which is practical and efficient. Another object is to provide a construction of the above nature wherein the component parts are joined in a dependable manner, affording a strong and durable structure. Another object is to provide a construction of the above nature which is neat and attractive in appearance. Another object is to provide a construction of the above nature wherein adjustments to meet varying conditions of use may be made conveniently. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention:

Similar reference characters refer to similar parts throughout the several views of the drawing.

Figure 1:
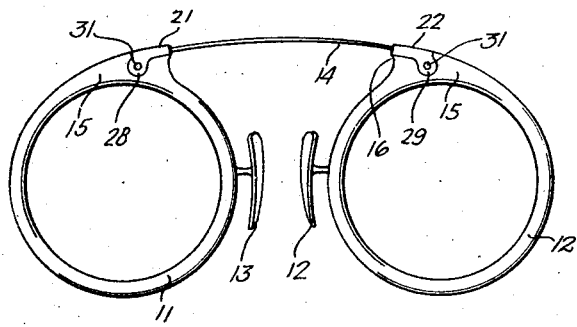
Figure 1 shows a completed eyeglass frame.

Referring now to the drawing in detail, there is shown in Figure 1 an eyeglass frame which includes a pair of rims 10 and 11 of non-metallic material such as celluloid or other material having properties similar to those of celluloid and employed in the construction of eyeglass frame parts. The rims are provided with nose pieces 12 and 13 which are shown in this instance as formed of metal although it is to be understood that these parts may take any of various forms. The eyeglass rim members 10 and 11 are joined together by a metal nose bridge member 14 which, in this instance, takes the form of a flat spring member. This spring member 14, in addition to connecting the eyeglass rims, serves to urge them toward each other and thus urges the nose pieces 12 and 13 into holding engagement with the sides of the nose of the wearer. The member 14, it will be understood, may take various forms and shapes. Its end connections with the two non-metallic rim members 10 and 11 are identical so that one only need be described in detail.

Figure 2:
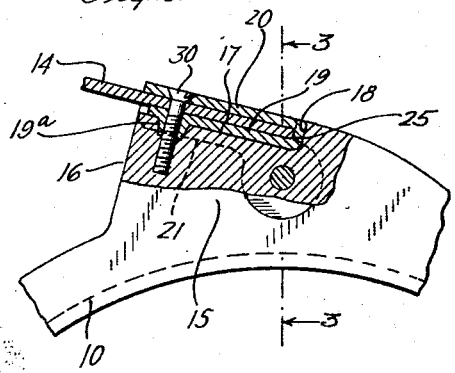
Figure 2 is a sectional view of a portion of the structure of Figure 1.

Considering the rim member 10, it is provided at its upper side with a portion 15 which is thickened in a radial direction beyond the thickness of the remaining portions of the rim. This thickened portion 15 is preferably formed by a gradual increase in thickness at one end and, at the other end, it preferably terminates in an abrupt shoulder 16. As shown in Figure 2, the outer peripheral surface of this thickened portion 15 is recessed or cut away at 17 for a distance back from the shoulder 16, forming a shoulder 18.

Positioned upon the surface 17 and resting thereon between the shoulder 18 and the edge of the shoulder 16 is a metal member which is tubular or hollow or box-like in shape, having a bottom wall 19 which rests against the surface 17, a top or outer wall 20 and side walls 21 and 22. Within this box-like metal member is received the end portion of the nose bridge member 14 which fits closely therein, its side edges resting snugly against the side walls 21 and 22.

Figure 4:
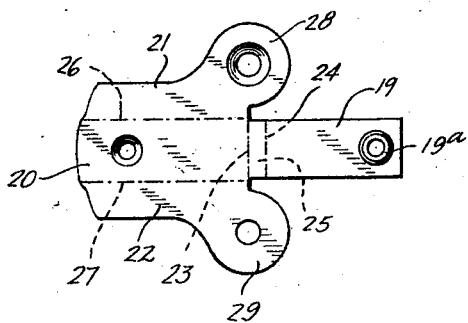
Figure 4 shows one of the parts at an early stage in its manufacture.
Figure 5:
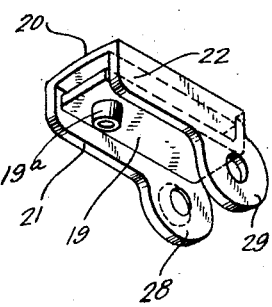
Figure 5 shows, in completed form, the part shown in Figure 4.

This box-like metal member is preferably formed of sheet metal and made in one piece as is shown in Figures 4 and 5. The member is preferably blanked out, by the use of suitable dies, in the shape shown in Figure 4. It is then bent along the dotted lines of Figure 4 and into the shape shown in Figure 5. The part 19 is bent downwardly along the dotted line 23 and then bent again along the dotted line 24 to its position shown beneath and substantially parallel to the part 20. The parts 19 and 20, with the connecting end wall 25, thus form a substantially U-shaped member whose open end rests substantially flush with the edge of the shoulder 16 of the non-metallic rim member. The side wall portions 21 and 22 are formed by bending these parts downwardly along the dotted lines 26 and 27 respectively to a position substantially at right angles to the part 20.

The side wall portions or flanges 21 and 22 have formed at the ends thereof depending ears or flanges 28 and 29 which embrace the sides of the thickened portion 15 of the eyeglass rim member. Preferably the side walls or flanges 21 and 22 overhang the surface 17, as is shown in Figure 2, and these parts 21 and 22 together with the ears 28 and 29 are preferably set into the non-metallic material so that the outer surfaces of the metal and of the non-metallic material rest substantially flush. This is brought out in Figure 3.

The end portion of the metal nose bridge member 14 rests snugly within the box-like enclosing walls of the metal member just described, its extreme end preferably abutting against the end wall 25. A screw 30 is passed through the outer wall 20, through the member 14 therebeneath, and is threaded into the bottom wall 19. This screw 30 is of such length that it projects through the bottom wall 19 and is threaded for a substantial distance into the non-metallic material. Preferably also, the wall 19 is provided with a downward projection 19$^a$ about the opening therethrough, this projection being also threaded for the passage of the screw 30 and affording thereby additional threads and a more secure holding.

Figure 3:
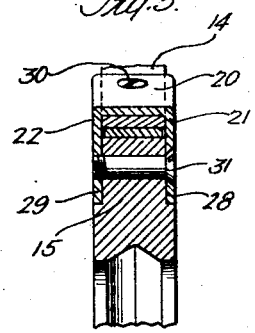
Figure 3 is a section taken substantially along the line 3—3 of Figure 2.

A second screw 31 is provided, passing through the ears 28 and 29 and through the non-metallic material embraced thereby. This screw, as shown in Figure 3, is preferably headed against one of the ears as 28 and threaded into the opposite ear.

The mounting above described affords a connection between the nose member 14 and the non-metallic rim member 10 which is highly advantageous. The member 14 has a long bearing within the boxlike metal member and, fitting snugly therein, is held against any side sway. The screw 30 holds the member 14 in place by virtue of its passing through an opening therein, and, in addition, it will be seen that the screw 30 draws the two walls 19 and 20 together to securely clamp the member 14. The projection 19$^a$, in addition to providing extra threads for the screw 30, being seated in a recess in the surface 17, aids in positioning and reinforcing the mounting of the metal member upon the non-metallic rim. The screw 31 draws the side flanges 21 and 22 together to firmly clamp the sides of the non-metallic member. The screw 30, entering the non-metallic material beneath the part 19 further reinforces the mounting of the box-like member.

Moreover, there is brought about a peculiarly advantageous coaction between the various parts in dependably holding the several members in assembled relation; thus, for example, the screw 30 and the clamping screw 31 hold the box-like sheet metal member securely to the non-metallic rims and each of these screws, which are directed into or through the non-metallic material of the rims at an angle of substantially 90° to one another, effectively prevents pivoting of the box-like sheet metal member about the other as an axis. Furthermore, the 90° relation above noted is of great practical advantage in that it avoids weakening of the relatively fragile non-metallic material of the rims. As will be seen from Figure 2, the right-hand end portion of the sheet metal box-like member snugly fits or abuts against the shoulder 18 in which the recess 17 terminates and there is thus brought about an effective reaction against any tendency of the box-like member to pivot (in clockwise direction as viewed in Figure 2) about the axis of the screw 31, and this action dependably reinforces and supplements the action of the screw 30 in holding the box-like member snugly down upon the rim; it will thus be seen that the action of the shoulder 18 is such as will tend to relieve the screw 30 of excessive strains when the spring bridge member 14 is bent in a direction to spread the rims 11 and 12 apart. Such advantages as these it will furthermore be noted are effectively achieved without detrimentally affecting the many other thoroughly practical results achieved.

The nose member 14 may be removed by simply removing the screw 30 and without disturbing the mounting of the parts which are secured to the non-metallic material. As the member 14, secured to the non-metallic rim member as above described, may take various forms and perform different functions, the term "nose member" as employed herein, is to be interpreted broadly to comprehend various forms of devices having to do with nose bridge members or nose-engaging parts.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In eyeglass construction, in combination, an eyeglass rim member of non-metallic material, a metal nose member, and means for securing said nose member to said rim member comprising a box-like metal member having top, bottom and side walls within which an end portion of said nose member is received, the bottom wall of said box-like member resting flatwise against the non-metallic material of the rim, a screw passing through the top wall of said box-like member, through said nose member therein and threaded into the bottom wall thereof, and means securing said box-like member in said flatwise position upon the periphery of said rim member.

2. In eyeglass construction, in combination, an eyeglass rim member of non-metallic material, a metal nose member, and means for securing said nose member to said rim member comprising a metal member having a part resting exterior of the periphery of said rim member and beneath which an end portion of said nose member is received and a flange extending inwardly toward the center of the eyeglass rim member, securing means passing through said rim member and through said flange, and a screw passing through said first part of said member, through said nose member and into the non-metallic material of said rim.

3. In eyeglass construction, in combination, an eyeglass rim member of non-metallic material, a metal member positioned upon said rim member having a box-like part resting against the periphery of said rim and provided with top, bottom and side walls, and a pair of depending flanges embracing the sides of said rim member, securing means passing through said flanges and through said non-metallic material embraced thereby, a nose member having a part resting within said box-like member, and a screw passing from the outer side of said box-like member through the top and bottom walls thereof and through said nose member therein and into said non-metallic rim member.

4. In eyeglass construction, in combination, an eyeglass rim member of non-metallic material, a metal nose member, and means for securing said nose member to said rim member comprising a member formed of a single piece of sheet metal folded to form a box-like part having top, bottom and side walls, said bottom wall being fixedly secured against the periphery of said rim member, and a pair of depending ears extending inwardly from the top wall adapted to embrace the sides of said rim member, an end portion of said nose member being received within said box-like part.

5. In eyeglass construction, in combination, an eyeglass rim member of non-metallic material, a metal nose member, and means for securing said nose member to said rim member comprising a member formed of a single piece of sheet metal folded to form a part having a top wall and a bottom wall between which an end portion of said nose member is received, said bottom wall resting against the periphery of said rim member, and a pair of depending ears embracing the sides of said rim member, securing means passed through said ears and through the non-metallic material embraced thereby, and a screw passing through said top wall, through said nose member therebeneath and threaded into said bottom wall, said last screw projecting beyond said bottom wall and into the non-metallic material of said rim.

6. In eyeglass construction, in combination, an eyeglass rim member of non-metallic material, a metal member positioned upon said rim member having a box-like part resting against the periphery of said rim and provided with top, bottom and side walls, and a pair of depending flanges embracing the sides of said rim member, said box-like part and said flanges being set into the non-metallic material so that the surfaces thereof rest substantially flush with the adjoining surfaces of said rim, and a metal nose member having an end portion held in said box-like part.

7. In eyeglass construction, in combination, an eyeglass rim member of non-metallic material, a metal nose member, and means for securing said nose member to said rim member comprising a member formed of sheet metal having an outer wall and an inner wall between which said nose member enters at one end thereof, said inner wall resting against the periphery of said rim member and being joined to said outer wall at the end opposite to that at which said nose member enters, the sides of said outer wall being extended to form depending flanges which embrace the sides of said rim member.

8. In eyeglass construction, in combination, an eyeglass rim member of non-metallic material having a portion thereof thickened in a radial direction, said thickened portion terminating at one end in an abrupt shoulder, a metal member secured upon said rim member comprising a substantially U-shaped part one wall of which rests against the outer surface of said thickened portion and the open end of which comes adjacent to said shoulder, and a metal nose member secured between the two sides of said U-shaped member.

9. In eyeglass construction, in combination, an eyeglass rim member of non-metallic material having a portion thereof thickened in a radial direction, said thickened portion terminating at one end in an abrupt shoulder, a metal member secured upon said rim member comprising a substantially U-shaped part one wall of which rests against the outer surface of said thickened portion and the open end of which comes adjacent to said shoulder, the other wall of said U-shaped part being flanged over along its side edges and embracing the sides of said thickened portion of said rim member, and a metal nose member secured between the two sides of said U-shaped member.

10. In eyeglass construction, in combination, a rim member of non-metallic material, a metal nose member, and means for securing said nose member to said rim comprising an inner metal part and an outer metal part between which a portion of said nose member is received and held, said inner metal part resting against the rim member and said outer part having depending side flanges embracing the sides of said nose member portion and the sides of said inner part.

11. In eyeglass construction, in combination, a pair of non-metallic rim members each adapted to hold a lens and each having at substantially adjacent portions thereof a nose piece for gripping the nose, a metal bridge member, and means for securing said bridge member to an upper portion of said rims and spaced peripherally from said nose pieces, said means including a sheet metal member mounted upon the rim and bent to provide two spaced parts, one of which is an inner part resting against the outer periphery of the rim and rigidly connected to the other or outer part to hold the latter in spaced relation therefrom, said outer part extending in a direction substantially toward the other rim, an end portion of said bridge member being received between said outer and inner parts, and a screw passed through said outer part of said sheet metal member from the outer side thereof for drawing said bridge member against one of said parts of said sheet metal member, and thereby to removably secure said bridge member in place.

12. In eyeglass construction, in combination, a pair of non-metallic rim members each adapted to hold a lens, a metal nose member, and means for securing said nose member to said rims including a sheet metal member having a part resting exterior of a substantially upper peripheral portion of the rim and extending in a direction toward the other rim and beneath which part an end portion of said nose member is received, a screw passing through said sheet metal member from the outer side thereof and into said nose member therebeneath to removably secure said nose member in place, said sheet metal member having also inwardly extending ears which embrace the sides of a portion of said non-metallic rim member offset in a peripheral direction from the portion thereof beneath said screw, and securing means extending from said ears into the non-metallic rim member.

13. In eyeglass construction, in combination, a non-metallic rim, a metal nose member, and means for securing said nose member to said rim, said means including a sheet metal member having a part resting exterior of the periphery of said rim and beneath which an end portion of said nose member is received, securing means acting between one of said members and the rim and entering the non-metallic material of said rim in a substantially radial direction, and securing means acting between the latter of said members and the rim and entering the non-metallic material of said rim in a direction substantially at right angles to said first direction.

14. In eyeglass construction, in combination, a non-metallic rim member, a metal nose member, and means for securing said nose member to said rim including a sheet metal member having a part resting exterior of the periphery of said rim and beneath which an end portion of said nose member is received, said sheet metal member having also inwardly extending ears which fixedly embrace the sides of a portion of said non-metallic rim member, and securing means acting between said metal member and said non-metallic rim member at a point spaced longitudinally of said rim from the portion embraced by said ears.

15. In eyeglass construction, in combination, a non-metallic rim member having a portion thereof thickened in a radial direction, said thickened portion terminating at one end in a shoulder and having a recess on its outer surface adjacent said shoulder, a sheet metal member set into said recess and having a part spaced from the bottom of said recess, the outer surface of said thickened portion of said rim being flush with the outer surface of said part of said sheet metal member, a nose member having an end portion received beneath said part of said metal member, said metal member having a pair of ears embracing the sides of a portion of said rim member, a screw passing from the outer side of said spaced part of said metal member and into said nose member in a substantially radial direction, and securing means extending from said ears into the non-metallic rim member and in a direction substantially transverse to the plane of the rim member.

16. In eyeglass construction, in combination, a non-metallic rim member having a portion thereof thickened in a radial direction, said thickened portion terminating at one end in a shoulder and being recessed on its outer surface adjacent said shoulder, a sheet metal member exterior of said recessed portion, a nose member having an end portion received beneath said metal member, said metal member having a pair of ears embracing the sides of a portion of said rim member, and a screw passing from the outer side of said metal member and into said nose member in a substantially radial direction and at a point between said shoulder and the portion of said rim embraced by said ears.

17. In eyeglass construction, in combination, a pair of non-metallic rims each for holding a lens and provided at substantially adjacent portions with means for engaging the nose; a metal bridge member; and means for securing said bridge member to said rims at substantially upper portions of the latter, said means including a sheet metal member secured to the rim at a substantially upper portion thereof, said sheet metal member having a part extending in a direction substantially toward the other rim, said sheet metal member having another part bent underneath and spaced from said first-mentioned part thereof and said bent part resting against the rim, an end portion of said bridge member being received between said spaced parts of said sheet metal member, and a screw passing through said bridge member from the outer side thereof and into the non-metallic rim for drawing said second-mentioned part of said sheet metal member and said nose member to the rim.

18. In eyeglass construction, in combination, a non-metallic rim member; a metal nose member; and means for securing said nose member to said rim including a sheet metal member having a part resting exterior of the periphery of said rim and beneath which an end portion of said nose member is received, a screw passing through said nose member from the outer side thereof, and metallic means beneath said nose member into which said screw passes, said metallic means being interlocked with the non-metallic material of said rim.

19. In eyeglass construction, in combination, a rim member of non-metallic material; a metal nose member; and means for securing said nose member to said rim comprising an inner metal part and an outer metal part between which an end portion of said nose member enters and is held, said inner metal part resting against the rim member and being connected to said outer metal part at the end remote from that at which said nose member enters, and means securing said metal parts to said rim member.

20. In eyeglass construction, in combination, a rim member of non-metallic material, a metal nose member, and means for securing said nose member to said rim comprising an inner sheet metal part and an outer sheet metal part between which a portion of said nose member is received and held, said inner metal part resting against the rim member and said outer part having depending side flanges embracing the sides of said nose member portion, the sides of said inner part and a portion of the non-metallic material of said rim member.

21. In eyeglass construction, in combination, a rim member of non-metallic material, a metal nose member, and means for securing said nose member to said rim comprising an inner metal part and an outer metal part between which a portion of said nose member is received and held, said inner metal part resting against the rim member and said outer part having depending side flanges embracing the sides of said nose member portion and the sides of said inner part, a screw passing through said outer part, through said nose member portion and threaded into said inner part, and securing means passing through said side flanges and through the non-metallic material therebetween.

22. In eyeglass construction, in combination, a non-metallic rim member, a metallic nose member, and means for securing said nose member to said rim including a plate-like metal part resting against the surface of said rim and having on its under side a projection extending into the non-metallic material, said nose member resting against the outer surface of said metal part, and a screw passing through said nose member from the outer side thereof and into a threaded opening in said metal part, said opening passing through said projection.

23. In eyeglass construction, in combination, a non-metallic rim member, a metal nose member, and means for securing said nose member to said rim including a metal member having an upper part beneath which an end portion of said nose member is received, said metal member having inwardly directed portions which laterally embrace said end portion of said nose member and flange-like means extending underneath said end portion of said nose member, said metal member having at one end thereof a pair of ears embracing the sides of a portion of the non-metallic rim, securing means extending from said ears into the portion of the non-metallic rim embraced thereby, and securing means at the other end of said metal member and extending into the non-metallic material of the rim.

24. In eyeglass construction, in combination, a lens-holding rim of non-metallic material; a metal nose member; and means for securing said nose member to said rim, said means including a sheet metal member beneath which an end portion of said nose member is received, said sheet metal member having inwardly directed flange-like members which embrace the sides of a portion of said non-metallic rim, a screw passing through said sheet metal member and said nose member, and a threaded metal member elongated in the direction in which said screw extends and embedded in the non-metallic material of said rim, said screw being received by said threaded member.

25. In eyeglass construction, in combination, a lens-holding rim of non-metallic material; a metal nose member; and means for securing said nose member to said rim, said means including a metal member having a part beneath which an end portion of said nose member is received, said metal member having inwardly directed portions which laterally embrace a part of said non-metallic rim, a securing member passing through said inwardly directed portions of said metal member and through the material of the rim embraced thereby, and a screw extending in a general radial direction into the non-metallic material of said rim and passing through said metal member and said nose member.

26. In eyeglass construction, in combination, a lens-holding rim of non-metallic material; a metal nose member; and means for securing said nose member to said rim, said means including a sheet metal member having a portion extending in the general direction of the periphery of the rim and beneath which portion an end part of said nose member is received, said sheet metal member having another portion extending substantially at right angles to the first mentioned portion thereof and set into the non-metallic material of said rim, securing means passing through the non-metallic material of said rim and through said second mentioned portion of said sheet metal member, and a screw extending in a general radial direction and passing through said nose member and into the non-metallic material of the rim.

27. In eyeglass construction, in combination, a non-metallic rim member having a portion thereof thickened in a radial direction, said thickened portion being cut away to provide a recess terminating in a shoulder at one end thereof; a metal nose member; a sheet metal member having flange-like means resting against the bottom of said recess and having an upper part held spaced from the bottom of said recess by said flange-like means, an end portion of said metal nose member being received between said flange-like means and said upper part, and said sheet metal member having a pair of ears embracing the sides of the non-metallic rim member, and securing means passing through said ears and through the non-metallic material embraced thereby, an end portion of said upper part of said sheet metal member abutting against said shoulder at the end of said recess.

In testimony whereof, I have signed my name to this specification this 12th day of November, 1926.

WILBUR H. SIDDALL.